Patented July 10, 1945

2,380,130

UNITED STATES PATENT OFFICE 2,380,130

ANTIOXIDANTS

Frank R. Valentine, Jr., Naugatuck, Conn., assignor to United States Rubber Company, New York, N. Y., a corporation of New Jersey No Drawing. Application January 29, 1943, Serial No. 473,975

4 Claims. (Cl. 260—463)

This invention relates to a new class of antioxidants or age-resisters for organic substances which tend to deteriorate by absorption of oxygen from the air, e. g., rubber or allied gums, unsaturated fatty oils, such as unsaturated vegetable oils, essential oils, petroleum oils and their derivatives such as gasolines, soaps, aldehydes, synthetic resins, turpentine, insecticides such as derris root, cube root and pyrethrum, and the like. The materials are exceptionally useful as flex-improvers or anti-flex cracking agents for vulcanized rubber, such as tire treads, which undergo repeated strains during use.

According to the invention the organic substance is incorporated with a chemical having the general formula

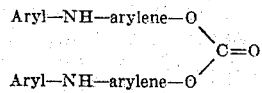

where aryl and arylene each refer to an aromatic nucleus of the benzene, naphthalene, or biphenyl series.

The aryl and arylene nuclei may contain as substituents alkyl, aryl, aralkyl, alkenyl, alkoxy, aryloxy, alkenyloxy, halogen, secondary and tertiary alkyl amino, secondary aryl amino, alkyl mercapto, etc.

The following formula is given to show the numbering used in the aryl nuclei of the compounds:

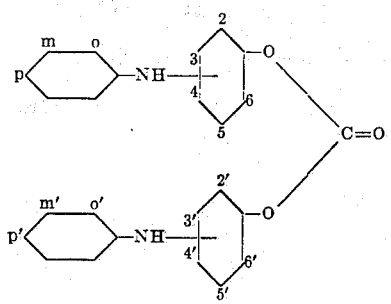

As specific examples, the following may be given:
4,4'-di-(phenylamino) diphenyl carbonate
3,3'-di-(phenylamino) diphenyl carbonate
2,2'-di-(phenylamino) diphenyl carbonate
4,4'-di-(naphthylamino) diphenyl carbonate
4,4'-di-(diphenylamino) diphenyl carbonate
3,3'-di-(p-tolylamino) diphenyl carbonate
4,4'-di-(o-tolylamino) diphenyl carbonate
4,4'-di-(p-benzylphenylamino) diphenyl carbonate
4,4'-di-(phenylamino) - 2,2' - dimethyl diphenyl carbonate
3,3'-di-(naphthylamino)-2,2' - dichloro diphenyl carbonate
4,4'-di - (p-isopropenylphenylamino) diphenyl carbonate
3,3'-di-(p-allyl phenylamino) diphenyl carbonate
4,4'-di-(p-anisylamino) diphenyl carbonate
4,4'-di-(p-phenetylamino) diphenyl carbonate
4,4'-di-(biphenylamino)-3,3' - dibromo diphenyl carbonate
3,3'-di-(p-phenoxy phenylamino) diphenyl carbonate
4,4'-di-(p-allyloxy phenylamino) diphenyl carbonate
2,2'-di-(p-chlorophenylamino) diphenyl carbonate
4,4'-di-(p-phenylamino phenylamino) diphenyl carbonate
3,3'-di-(m-phenylamino phenylamino) diphenyl carbonate
4,4'-di-(p-dimethylamino phenylamino) diphenyl carbonate
4,4'-di-(p-ethylamino phenylamino) diphenyl carbonate
4,4'-di-(phenylamino)-2,2'-di-tertiary butyl diphenyl carbonate
4,4'-di-(phenylamino) di-alpha-naphthyl carbonate
4,4'-di-(p-tolylamino) di-beta-naphthyl carbonate
4,4'-di-(naphthylamino) 2,2'-diphenyl diphenyl carbonate
4,4'-di-(phenylamino) 2,2'-dimethoxy di-alpha-naphthyl carbonate In general, these carbonates may be prepared by passing phosgene into a solution or suspension of the sodium salt of the phenol in a suitable liquid. Generally, symmetrical carbonates are made in this way, but, if a mixture of arylamino phenols is used, as for example mixed phenyl-amino cresols, an unsymmetrical product will result.

The following examples illustrate the invention, the parts being by weight:

EXAMPLE 1

4,4'-di-(phenylamino) diphenyl carbonate may be prepared by dissolving 5.6 grams of metallic sodium (0.244 mole) in 250 cc. of absolute alcohol and adding 30 grams of 4-hydroxy diphenylamine (0.162 mole). After the 4-hydroxy diphenylamine has dissolved, the alcohol is removed on the steam bath. Acetone (150 cc.) is added and the suspension stirred and cooled in an ice bath. Over a period of 30 minutes, 7.9 grams of phosgene (0.08 mole) is passed into the suspension and after the addition is complete, the stirring is continued for 15 minutes. Water is added and the mixture extracted with benzene. The benzene solution is washed with sodium hydroxide solution, water, and dried. Removal of the benzene leaves an oily solid which is boiled with alcohol, cooled, and filtered. The solid 4,4'-diphenylamino diphenyl carbonate weighed 5.2 grams and melted at 159–161° C. After crystallization from alcohol-benzene it melted at 160–161° C.

Analysis: Calculated for $C_{25}H_{20}N_2O_3$: 7.07 percent nitrogen; found: 7.28 percent nitrogen.

EXAMPLE 2

*Preparation of 4,4'-di-(beta-naphthylamino) diphenyl carbonate*

Para-hydroxy phenyl beta naphthylamine (50 grams), 0.21 mole, was dissolved in 500 cc. of acetone and 5.4 grams of sodium (0.232 mole) added. After the sodium had dissolved, 10 grams of phosgene (0.1 mole) was passed into the cooled, well stirred mixture. The mixture was then diluted with 500 cc. of water and the solid filtered, washed with water and dried. It weighed 33 grams. After crystallization from dilute acetone it melted at 170–171° C.

EXAMPLE 3

These materials have been found to be useful as preservatives for rubber. Thus, tests were made on the following compound:

*Master batch*

| | Parts |
|---|---|
| Pale crepe | 100.0 |
| Zinc oxide | 10.0 |
| Lithopone | 60.0 |
| Whiting | 60.0 |
| Sulphur | 3.0 |
| Tetramethyl thiuram monosulfide | 0.15 |

To the master batch, 4,4'-di-(phenylamino) diphenyl carbonate and 4,4'-di-(beta-naphthylamino) diphenyl carbonate were added in the proportion of 1 part to 100 parts of rubber. Cures were made for 10, 20, and 30 minutes at 25 pounds per square inch steam. The percent remaining tensile before and after ageing 96 hours under 300 pounds per square inch oxygen at 70° C. are as follows:

| | Control | Chemical I |
|---|---|---|
| Unaged | 100 | 100 |
| Aged | 16 | 62 |

| | Control | Chemical II |
|---|---|---|
| Unaged | 100 | 100 |
| Aged | 16 | 53 |

Chemical I: 4,4'-di-(phenylamino) diphenyl carbonate.

Chemical II: 4,4'-di-(beta-naphthylamino) diphenyl carbonate.

The invention may be applied to the preservation of, broadly, natural rubber compositions as well as artificially-prepared rubber compositions, such as polychloroprene, olefine polysulfides, butadiene polymers, modified butadiene polymers (Buna N and Buna S), and including reclaims, and latices of such compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surface of vulcanized or unvulcanized rubber goods.

Having thus described my invention, what I claim and desire to protect by Letters Patent is:

1. A 4,4'-di-(arylamino) diaryl carbonate.
2. 4,4'-di-(phenylamino) diphenyl carbonate.
3. 4,4'-di-(beta-naphthylamino) diphenyl carbonate.
4. A di-(arylamino) diaryl carbonate.

FRANK R. VALENTINE, Jr.